(12) United States Patent
Kieliger et al.

(10) Patent No.: US 9,175,988 B2
(45) Date of Patent: Nov. 3, 2015

(54) MEASURING DEVICE HOUSING

(71) Applicant: Siemens Aktiengesellschaft, Munich (DE)

(72) Inventors: Joe Kieliger, Jona (CH); Martin Lenze, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/426,734

(22) PCT Filed: Aug. 14, 2013

(86) PCT No.: PCT/EP2013/067030
§ 371 (c)(1),
(2) Date: Mar. 7, 2015

(87) PCT Pub. No.: WO2014/040817
PCT Pub. Date: Mar. 20, 2014

(65) Prior Publication Data
US 2015/0241252 A1    Aug. 27, 2015

(30) Foreign Application Priority Data

Sep. 13, 2012    (DE) .......................... 10 2012 216 267

(51) Int. Cl.
| | |
|---|---|
| *G01D 11/24* | (2006.01) |
| *G01J 5/04* | (2006.01) |
| *G01J 5/00* | (2006.01) |
| *G01J 5/02* | (2006.01) |
| *G01J 5/06* | (2006.01) |
| *G01J 5/08* | (2006.01) |

(52) U.S. Cl.
CPC ............. *G01D 11/245* (2013.01); *G01J 5/0088* (2013.01); *G01J 5/029* (2013.01); *G01J 5/041* (2013.01); *G01J 5/043* (2013.01); *G01J 5/061* (2013.01); *G01J 5/089* (2013.01)

(58) Field of Classification Search
USPC .......................................................... 73/431
See application file for complete search history.

(56) References Cited

U.S. PATENT DOCUMENTS

| | | | |
|---|---|---|---|
| 5,201,227 | A | 4/1993 | Iinuma et al. |
| 2006/0140754 | A1 | 6/2006 | Tanioka |

(Continued)

FOREIGN PATENT DOCUMENTS

| | | |
|---|---|---|
| DE | 69208860 T2 | 8/1996 |
| DE | 69722305 T2 | 4/2004 |

(Continued)

*Primary Examiner* — Lisa Caputo
*Assistant Examiner* — Jamel Williams
(74) *Attorney, Agent, or Firm* — Beusse Wolter Sanks & Maire

(57) ABSTRACT

A measuring device housing for a sensor component, which detects a physical parameter without contact is provided, having: a coupling apparatus for supplying at least one flushing medium and at least one signal transmission line in the housing interior, a guide pipe arranged on the coupling apparatus having a longitudinal axis and a probe head fastened on the end section of the guide pipe. The guide pipe is designed to conduct or accommodate the at least one cooling medium and the at least one signal transmission line up to the probe head. The probe head and the end section, relative to the longitudinal axis of the guide pipe or the probe head, each have radially extending passages for conducting the cooling media from the end section into the probe head and the reverse, as applicable.

14 Claims, 7 Drawing Sheets

(56) References Cited

U.S. PATENT DOCUMENTS

| | | | |
|---|---|---|---|
| 2010/0186417 A1* | 7/2010 | Blomeyer | F23D 11/36 60/772 |
| 2012/0174590 A1 | 7/2012 | Krull et al. | |
| 2013/0036843 A1* | 2/2013 | Pfauch | G01D 11/245 73/866.5 |

FOREIGN PATENT DOCUMENTS

| | | |
|---|---|---|
| DE | 102005060961 A | 7/2006 |
| DE | 202006007648 U | 7/2006 |
| DE | 102005036865 A1 | 2/2007 |
| DE | 202007006784 U | 9/2007 |
| DE | 102006022983 A | 11/2007 |
| DE | 102006048898 A | 4/2008 |
| DE | 102011057158 A1 | 7/2012 |
| EP | 2557417 A1 | 2/2013 |
| GB | 746045 A | 3/1956 |
| GB | 832242 A | 4/1960 |
| WO | 2012055795 A1 | 5/2012 |

* cited by examiner

MEASURING DEVICE HOUSING

CROSS REFERENCE TO RELATED APPLICATIONS

This application is the U.S. National Stage of International Application No. PCT/EP2013/067030 filed Aug. 14, 2013, and claims the benefit thereof. The International Application claims the benefit of German Application No. DE 102012216267.4 filed Sep. 13, 2012. All of the applications are incorporated by reference herein in their entirety.

FIELD OF INVENTION

The invention relates to a measuring device housing for a sensor component which detects a physical quantity contactlessly, or for such a sensor, comprising a coupling apparatus for feeding at least one coolant and/or flushing medium and at least one signal transmission line into the housing interior or into a housing wall, a guide tube arranged on the coupling apparatus and having a longitudinal axis, and a probe head fastened to an end section of the guide tube lying opposite the coupling apparatus, wherein the guide tube is configured in order to guide or accommodate at least one medium and the at least one signal transmission line as far as the probe head.

BACKGROUND OF INVENTION

A measuring device having such a housing is known, for example, from DE 10 2005 060 961 A1. The measuring device, also referred to as a measuring lance, principally comprises a tube in which the sensor lines and cooling air can be guided. The sensor lines and the coolant are introduced, or fed in, at one end of the tube. When the measuring lance is used in a gas turbine for radial gap detection, this end of the tube is arranged outside the housing of the gas turbine. The sensor is fastened on the other end of the tube. In order to protect the sensor from overheating, it is flanked by coaxial cooling air bores through which the cooling air flowing in the tube can emerge.

It is found disadvantageous that the sensor and its housing are relatively large and therefore have an increased cooling air requirement so that they can be used reliably. Another disadvantage is that the known measuring device is furthermore configured only for a single sensor.

SUMMARY OF INVENTION

An object of the invention is therefore to provide a measuring device housing for a sensor component which detects a physical quantity contactlessly, or for such a sensor, which on the one hand is relatively compact and in which the probe head can be replaced relatively easily.

This object of the invention is achieved with a measuring device housing according to the features of the independent claim. Advantageous configurations are specified in the dependent claims, which may be combined with one another in any desired way.

According to aspects of the invention, the probe head and the end section of the guide tube of the measuring device housing respectively comprise passages, extending radially relative to its longitudinal axis, for forwarding a coolant and/or flushing medium, or a plurality of coolants and/or flushing media, or the coolant from the end section into the probe head and optionally vice versa.

With the aid of the aforementioned configuration, it is possible to convey a coolant and/or flushing medium, or a plurality of such media, along the guide tube of a measuring device and to deliver it or them at the end section thereof into the probe head, and optionally convey it or them back therefrom. The delivery of the media takes place through passages, which are located both in the probe head and in the end section of the guide tube and which respectively extend radially. For each coolant, or for each delivery, the assigned passages must then be arranged in the same axial section. Since it is relatively difficult to align the passages in the probe head radially with the passages in the end section, an axially limited annular channel is left radially between the probe head and the guide tube, through which the coolant fed through the passages of the guide tube can subsequently be introduced through the radial passages of the probe head into the interior of the probe head. Of course, the same also applies for conveying back a medium which has already been used for its intended purpose. Advantageously, the passages are configured as radial bores in the guide tube and in the probe head, the outer openings of which have optionally been closed with plugs.

A particular advantage of the invention is that when the probe head is fastened releasably in the end section of the guide tube, which may be possible using a screw connection, different probe heads with differently arranged recesses can be releasably fastened on the guide tube, without the rest of the measuring device housing having to be replaced or provided in duplicate. This reduces the production costs of measuring devices, since for different viewing directions of optical probes it is then only necessary to provide different probe heads; the rest of the measuring device, or of the measuring device housing, can be used several times.

If a plurality of coolants and/or flushing media are guided in separate axial channels inside a guide tube, it is advantageous for a ring seal to be provided between the radial passages, which are distributed along the longitudinal axis, for axial delimitation of the annular channels. In this way, mixing of the separately guided different coolants can be avoided when delivering the coolant from the guide tube into the probe head, and optionally vice versa.

Advantageously, the probe head comprises a freely ending probe tip, and the end section of the guide tube and the probe head overlap axially in such a way that the radial passages are arranged axially between the fastening—for example the screw connection of the probe head and the end section—and the probe tip.

Also, a plurality of radial passages are provided in the circumferential direction of the probe head and/or the end section, so that a sufficiently large cross-sectional area can already be provided for the coolant in question. This reduces pressure losses during the guiding of the coolant in the measuring device housing.

In order to ensure an accurate fit of the probe head in the end section of the guide tube, guide elements may be provided either on the probe head or in the end section.

In order to separately guide different coolants relatively simply along the guide tube, along the end section and along the probe head, axially extending channels which extend on a radius lying coaxially with the midaxis of the guide tube, of the end section and of the probe head, respectively, are provided in these components, the channels being in flow connection with the radial passages assigned to them.

If the physical quantity to be detected includes light waves, a means for delivering the quantity to be detected into the housing interior may be provided in the probe head. In the latter configuration, the means may be a thermally stable light-transmissive aperture, which is seated in a recess of the probe head, at least one cooling channel being provided between the aperture and the wall bounding the recess. In this way, the thermally stable light-transmissive aperture can be cooled particularly simply, which can contribute to its thermal stability. The configuration in which the guide tube and the end section are externally insulated is also advantageous.

The end section may be a monolithic part of the guide tube or be fastened thereon.

Advantageously, three different media are fed into the probe head, two of which can be conveyed back from the probe head into the guide tube. This requires that there be at least four sections distributed along the axial direction, in which passages distributed over the circumference and extending in the radial direction are accommodated in the guide tube and in the probe head, these being sealed from one another by ring seals arranged between them.

BRIEF DESCRIPTION OF THE DRAWINGS

Other advantages and features of the invention will be explained in more detail with the aid of an exemplary embodiment.

In all the figures, features which are the same are provided with the same references.

DETAILED DESCRIPTION OF INVENTION

Figure 1:
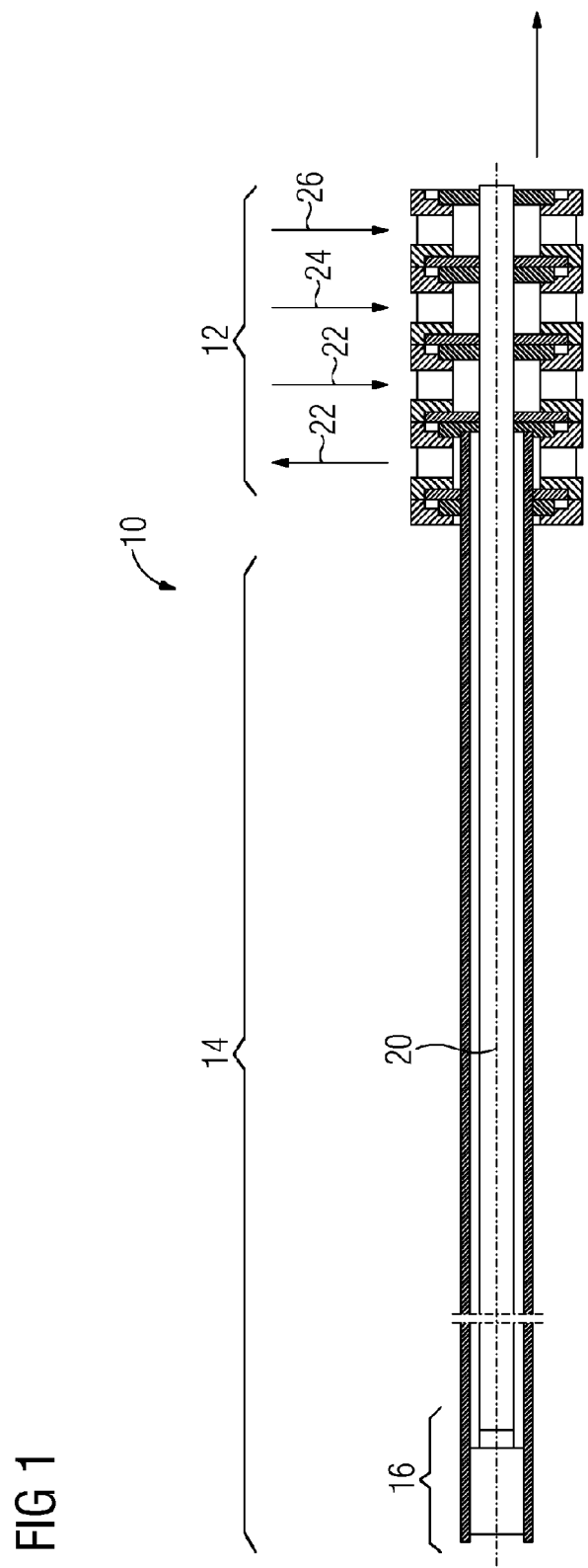
FIG. 1 shows the longitudinal section through a measuring device housing.

FIG. 1 schematically shows a measuring device housing 10 in a longitudinal section. The measuring device housing 10, referred to below merely as the housing 10 for brevity, essentially comprises three components: a coupling apparatus 12, a guide tube 14 with an end section 16, and a probe head screwed into the end section 16. The probe head is not represented in FIG. 1. The guide tube 14 extends along a longitudinal axis 20. Without showing further details in FIG. 1, the coupling apparatus 12 is configured in order to feed in total three media 22, 24 and 26 into the measuring device housing 10 and deliver them separately to the guide tube 14. Of the three media, two can be conveyed out again as coolants. The media 22, 24, 26 are guided separately from one another inside the housing 10 as far as the end section 16 of the guide tube 14, and are delivered there to the probe head. The design required for this will be explained in more detail in the following figures.

Figure 2:
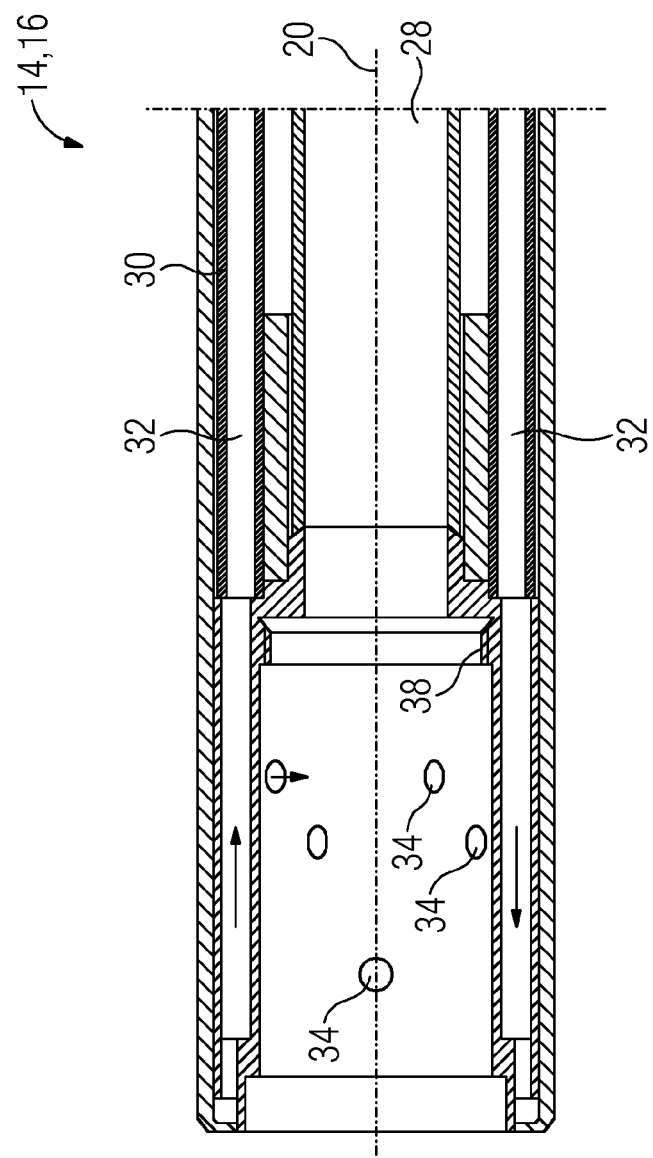
FIGS. 2, 3 respectively show a longitudinal section through the end, receiving a probe head, of a guide tube of the measuring device housing.

FIG. 2 shows the end section 16 of the guide tube 14 as an enlarged detail. The guide tube 14 is configured to be hollow internally, the cavity 28 being used on the one hand to convey back one of the media and on the other hand to accommodate signal transmission lines or sensor lines. An optical fiber or a light waveguide, for example, may be fitted in the cavity 28. It is also possible to arrange electrical lines of a sensor therein, which sensor is then fitted in the probe head. Whenever the measuring device housing 10 accommodates a sensor or a signal transmission line for or from the sensor, this is also to be understood as a measuring device.

The guide tube 14 may furthermore be externally insulated, or heat lagged, although this is not represented.

The particular feature of the guide tube 14 is that it is configured to be relatively thick-walled, so that a number of channels 32 are arranged in its wall 30 while being distributed over the circumference, and therefore coaxially with the longitudinal axis 20. In the longitudinal section (according to FIG. 2), two of these channels 32 are represented, which may be arranged at a 12 o'clock position and at a 6 o'clock position, for example, in relation to the numbers on a clock. Axially extending channels 32 are also respectively provided at different circumferential positions (for example 1 o'clock, 2 o'clock, 3 o'clock, 4 o'clock, 5 o'clock, 7 o'clock, 8 o'clock, 9 o'clock, 10 o'clock, 11 o'clock), so that the different media 22, 24, 26 can be fed separately from one another through the individual channels 32. The channels 32 arranged in the guide tube 14 extend from the coupling apparatus 12 into the end section 16 arranged on the guide tube 14. Those sections of the channels 32 which extend axially in the end section 16 may, for example, be produced by boring, in which case the bore openings may be closed again on the end side by plugs 36. At different circumferential positions of the corresponding channels 32, a further bore extending from the outside into the interior of the end section 16 is provided for each channel 32. Parts of these bores—namely the outer part—are then closed again from the outside by plugs 36, so that the residual bores then form the radial passages 34 through which the medium flowing in the channels 32 is deviated radially inward.

The end section 16 may, for example, be fastened on the guide tube 14 with a material fit by soldering. The end section may, however, also be part of the guide bore 14.

Figure 3:
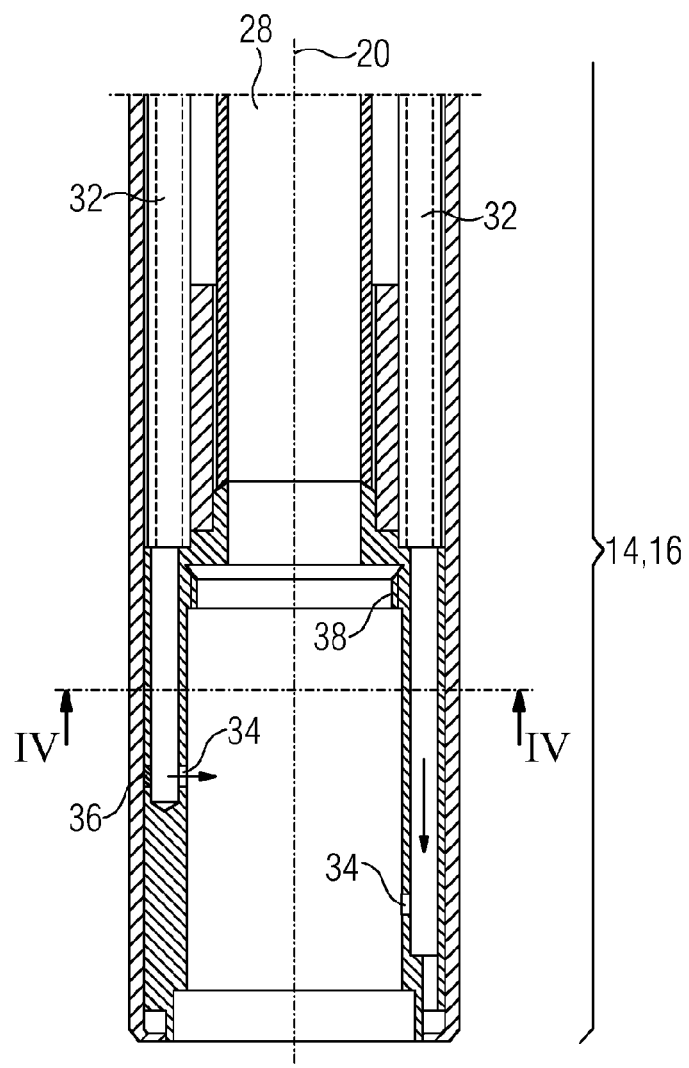

Provided in the end section 16 is an internal screw thread 38 into which a probe head (also not represented in FIG. 2) can be screwed. FIG. 3 shows the same longitudinal section as FIG. 2, but the end section 16 is monolithic, or part of the guide tube 14.

FIG. 3 furthermore represents that the radial passage 34, which has been produced by boring, is partially closed again from the outside by a plug 36. It is therefore possible to connect the channel 32 fluidically to the radial passage 34.

Figure 4:
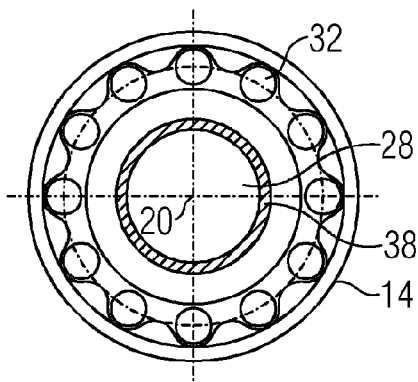
FIG. 4 shows the cross section through an end section of the guide tube.

FIG. 4 shows the cross section through the end section 16 of the guide tube 14. One of the channels 32 extending in the axial direction, of which there are twelve in total, is represented every 30°. The screw thread 38 for fastening the probe head 18 is provided inside the guide tube 14.

Figure 5:
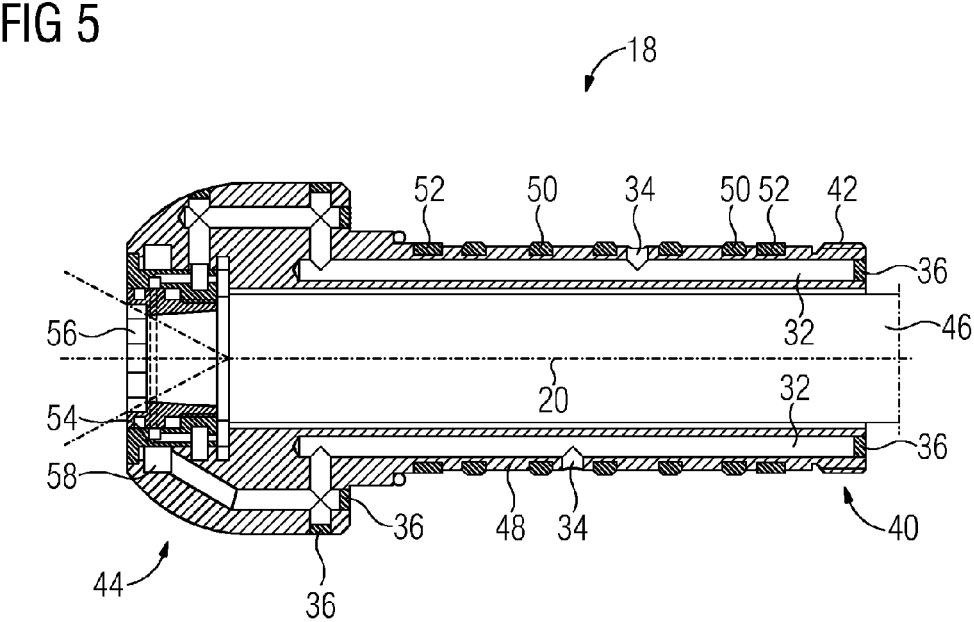
FIG. 5 shows a longitudinal section through a probe head.

FIG. 5 shows a first exemplary embodiment of a probe head 18. The probe head 18 has a first end 40, on which a screw thread 42 for screwing the probe head 18 into the guide tube 14 is provided. The other axial end of the probe head 18 is referred to as a probe tip 44. The probe head 18 is configured overall in the form of a sleeve with a cavity 46 on the inside. The tubular wall 48 of the probe head 18 is equipped in a similar way to the guide tube 14 with channels 32 extending in the axial direction, which may likewise be produced by boring. After the boring, some of the bore openings are closed with the aid of plugs 36. In analogy with the guide tube 14 represented in FIG. 4, the probe head 18 also has a corresponding number of cooling channels 32 distributed along the circumference and arranged coaxially with the longitudinal axis 20. In order to deliver the coolants 22, 24, 26 provided by the guide tube 14 separately into the probe head 18, radial passages 34 produced by blind-hole bores are arranged at corresponding axial positions in its wall 48. With the aid of these passages 34, different coolants 22, 24, 26 can be delivered into the probe head 18 in different channels 32. In order to avoid mixing of the different coolants 22, 24, 26 during delivery, ring seals 50 are provided between axially neighboring radial passages 34. In the exemplary embodiment shown, five ring seals 50 are provided. The two outermost ring seals 50 are in this case flanked by guide elements 52 in order to ensure an accurate fit of the probe head 18 in the end section 14. At the probe tip 44, the probe head 18 has a recess 54 into which an aperture 56 is fitted. A cooling channel 58 may furthermore be provided between the wall of the recess 54 and the aperture 56, in order to cool the usually circular aperture 56 with coolant.

Figure 6:
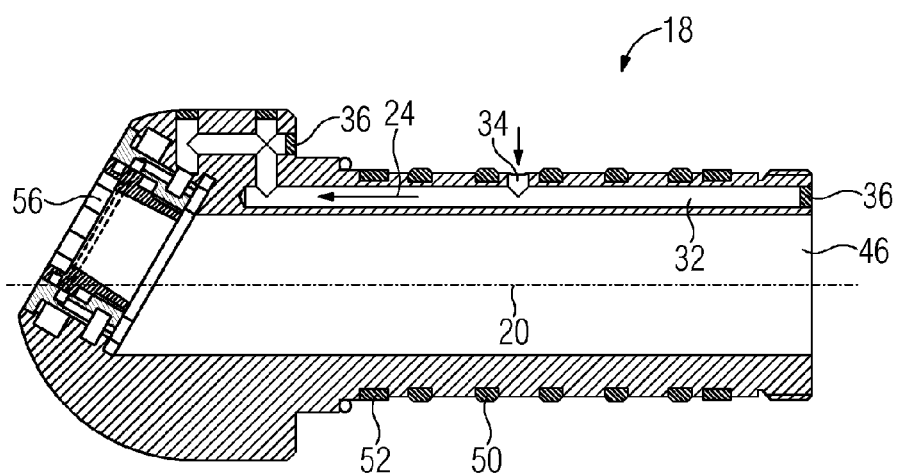
FIGS. 6, 7, 8 show further longitudinal sections through the probe head.
Figure 7:
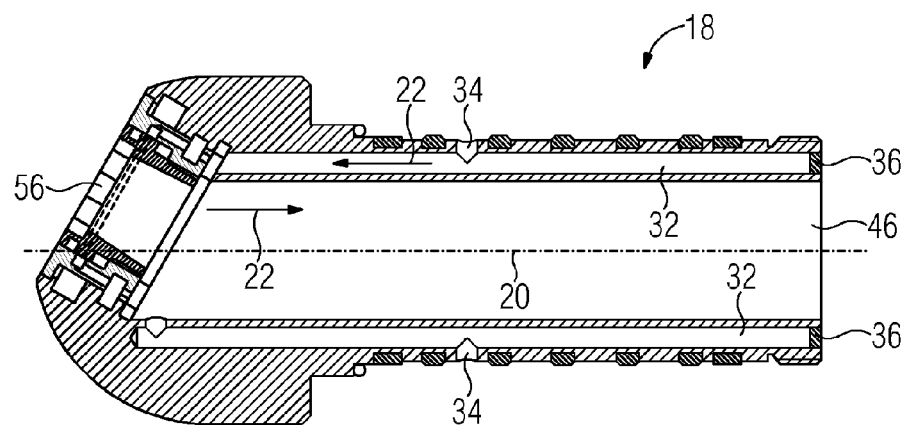
Figure 8:
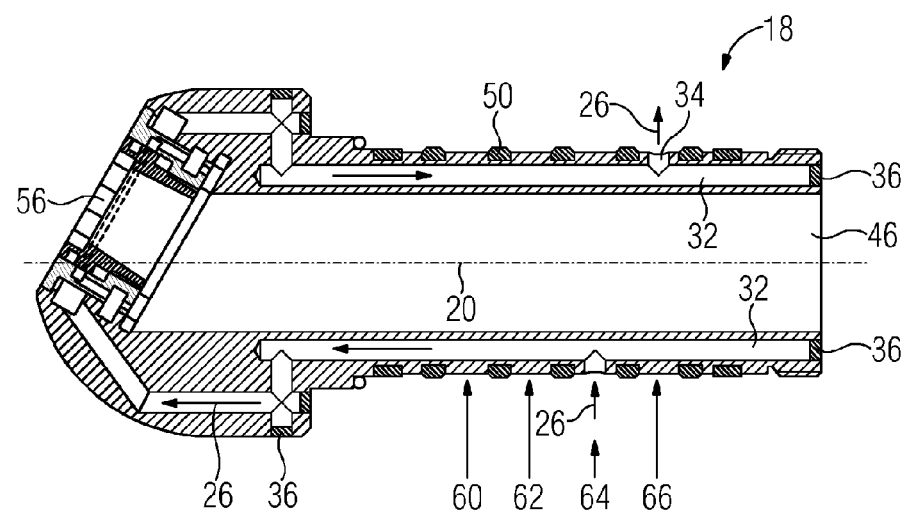

In the exemplary embodiment of the probe head 18 represented in FIG. 5, the viewing direction of the probe head coincides with the longitudinal axis 20. For this reason, the aperture 56 is oriented perpendicularly to the longitudinal axis 20. In FIGS. 6 to 8, a further exemplary embodiment of the probe head 18 is shown in longitudinal sections lying in different planes.

In the further exemplary embodiment, the viewing direction of the probe head is inclined by about 30° relative to the longitudinal axis 20. The section planes represented in FIGS. 6 to 8 are respectively offset with respect to one another by an angle of 30°, and therefore correspond to the longitudinal sections of three planes which are spanned by different diameters with the longitudinal axis. For example, the three diameters may in this case lie on different chords: between 1 o'clock and 7 o'clock, between 2 o'clock and 8 o'clock, and between 3 o'clock and 9 o'clock.

Likewise as in the first exemplary embodiment of the probe head 18 according to FIG. 5, four axially successive sections 60, 62, 64, 66, which are separated from one another by ring seals 50, are provided in the second exemplary embodiment of the probe head 18 according to FIGS. 6 to 8. In section 60, cooling air 22 can be fed through the passages 34 (FIG. 7) to the channels 32. It is subsequently guided to the recess 54, after which it can be fed out centrally from the probe head 18 through the cavity 46. Both channels 32 and passages 34 represented in FIG. 7 are therefore used as feed lines for cooling air 22, while the cavity 46 is used to discharge the then heated cooling air 22.

In the second axial section 62, a second medium 24 in the form of so-called "flushing air" can be fed through the radial passage 34 represented in FIG. 6. This flushing air is fed through further sections to the aperture 56, and prevents contamination of the surface of the aperture 56 on the hot gas side. In section 64, a third coolant 26, for example cooling water, can be introduced into the probe head 18 in the channel 32 represented in FIG. 8 (arranged at 9 o'clock). This cooling water 26 subsequently flows to the aperture 56, flushes it and then flows out of the probe head 18 through the cooling channel 32 represented at the top in FIG. 8 and the radial passage 34, which is arranged in the fourth section 66. The extracted coolant 26 then enters the guide tube 14 again and is guided to the end of the latter on the coupling side.

Figure 9:
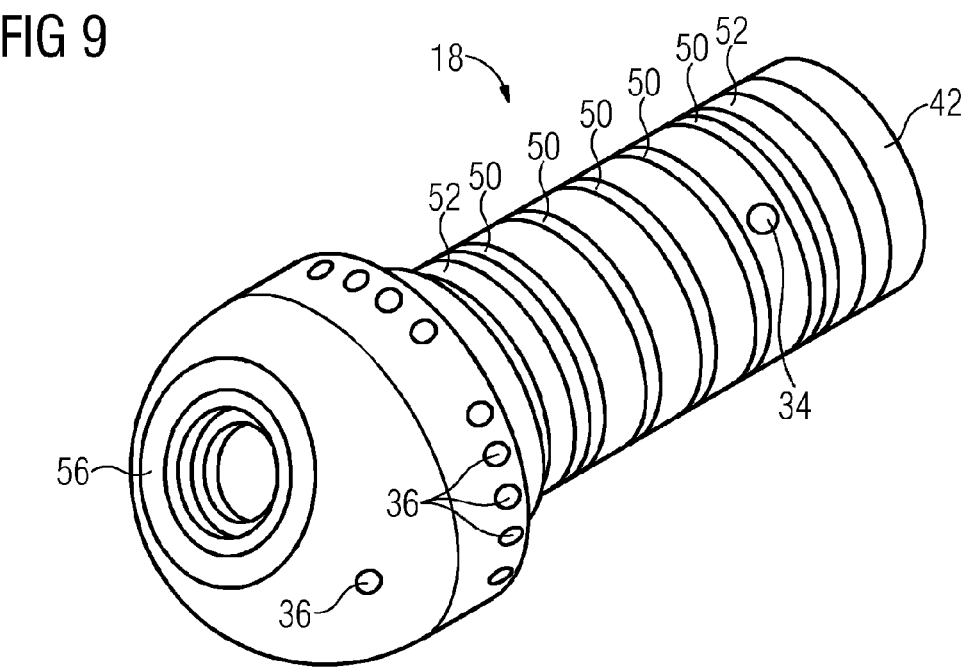
FIGS. 9, 10, 11 show different probe heads for different detection directions.
Figure 10:
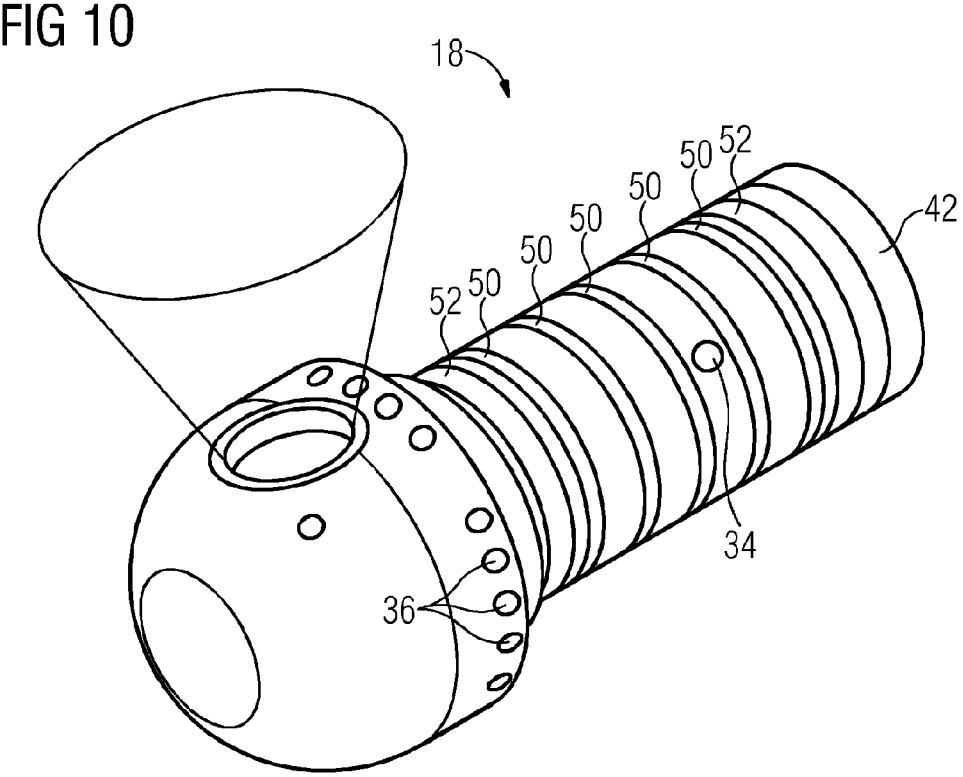
Figure 11:
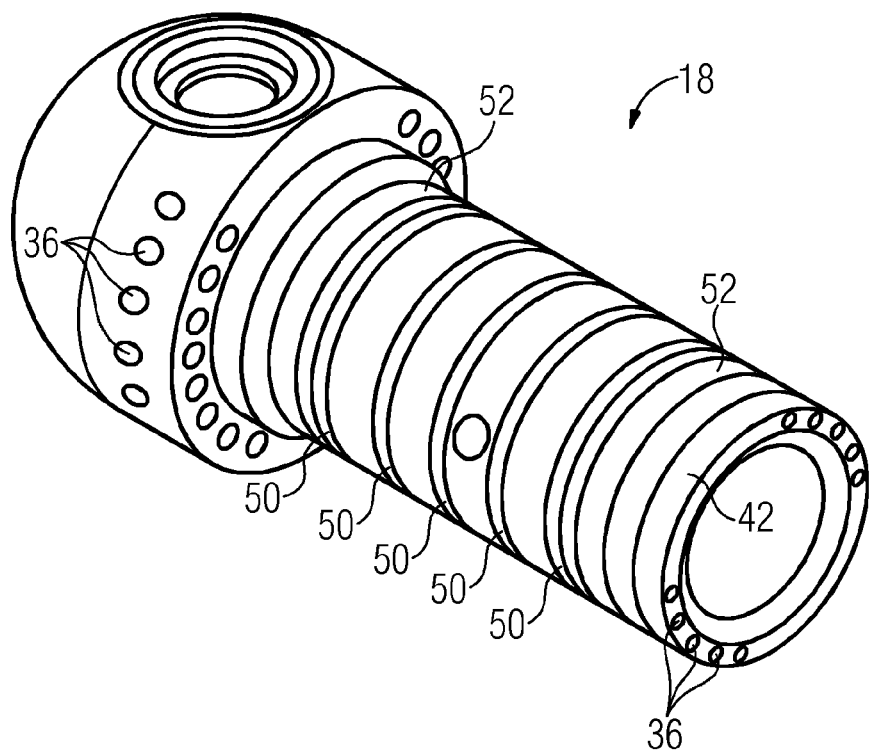

FIGS. 9 to 11 show probe heads 18 for different viewing directions in a perspective representation: a probe head with a viewing angle of 30° is represented in FIG. 9, a probe head with a viewing angle of 80° is represented in FIG. 10, and the probe head with a viewing angle of 90° is represented in FIG. 11. The following features are furthermore represented in FIGS. 9 to 11: the axial sections 60, 62, 64, 66, the sealing rings 50, the screw thread 42 for screwing the respective probe head 18 into the guide tube 14, and the radial passages 34 arranged in the different axial sections 60 to 66.

Overall, the present invention provides a measuring device housing 10 for a sensor component which detects a physical quantity contactlessly, or for such a sensor, which comprises: a coupling apparatus 12 for feeding at least one coolant and/or flushing medium 22, 24, 26 and at least one signal transmission line into the housing interior or into a housing wall, a guide tube 14 arranged on the coupling apparatus 12 and having a longitudinal axis 20, and a probe head 18 fastened to an end section 16 of the guide tube 14 lying opposite the coupling apparatus 12, wherein the guide tube 14 is configured in order to guide or accommodate the at least one coolant 22, 24, 26 and the at least one signal transmission line as far as the probe head 18. In order to provide a relatively small and compact measuring device, and therefore also a measuring device housing 10 in which different coolants 22, 24, 26 conveyed in the guide tube 14 can be delivered reliably to different probe heads relatively easily, it is proposed that the probe head 18 and the end section 16 respectively comprise passages 34, extending radially relative to the longitudinal axis 20 of the guide tube 14 or the probe head 18, for forwarding the coolant or the coolants 22, 24, 26 from the end section 16 into the probe head 18 and optionally vice versa.

The invention claimed is:

1. A measuring device housing for a sensor component which detects a physical quantity contactlessly, or for such a sensor, comprising:
   a coupling apparatus for feeding at least one coolant and/or flushing medium and at least one signal transmission line into the housing interior or into a housing wall,
   a guide tube arranged on the coupling apparatus and having a longitudinal axis, and
   a probe head releasably fastened in an end section of the guide tube lying opposite the coupling apparatus,
   wherein the guide tube is configured to guide or accommodate the at least one coolant and/or flushing medium and the at least one signal transmission line as far as the probe head,
   wherein the probe head and the end section respectively comprise passages, extending radially relative to the longitudinal axis, adapted for forwarding the coolant or the coolants from the end section into the probe head, and
   wherein an axially limited annular channel is formed radially between probe head and the guide tube, through which the coolant fed through the passages of the guide tube can subsequently be introduced through the radial passages of the probe head into the interior of the probe head.

2. The measuring device housing as claimed in claim 1, wherein the probe head comprises a freely ending probe tip, and the end section of the guide tube and the probe head overlap axially such that the passages are arranged axially between the fastening of the probe head and the end section and the probe tip.

3. The measuring device housing as claimed in claim 1, further comprising
   a plurality of radial passages, between which a ring seal is provided, wherein the plurality of radial passages are distributed along the longitudinal axis.

4. The measuring device housing as claimed in claim 1, further comprising
   a plurality of passages in the circumferential direction of the probe head, or the end section.

5. The measuring device housing as claimed in claim 1, further comprising
   guide elements for an accurate fit on the probe head in the overlap section.

6. The measuring device housing as claimed in claim 1, further comprising
   axially extending channels arranged on a radius lying coaxially with the midaxis of the guide tube, of the end section and of the probe head, respectively, the channels provided in the guide tube, in the end section and in the probe head, and the channels being in flow connection with the passages.

7. The measuring device housing as claimed in claim 1, wherein the probe head is adapted for delivering the quantity to be detected into the housing interior.

8. The measuring device housing as claimed in claim 7, wherein the adaptation for delivering the quantity to be detected into the housing interior is a thermally stable light-transmissive aperture, which is seated in a recess of the probe head, and at least one cooling channel is provided between the aperture and the wall bounding the recess.

9. The measuring device housing as claimed in claim 1, wherein the guide tube and the end section are externally insulated.

10. The measuring device housing as claimed in claim 1, wherein the end section is a monolithic part of the guide tube or is fastened thereon.

11. A measuring device comprising:
a measuring device housing as claimed in claim 1, and
a signal transmission line arranged in the guide tube.

12. The measuring device housing as claimed in claim 1, wherein the probe head is screwed for releasably fastening.

13. The measuring device housing as claimed in claim 1, wherein the passages are adapted for forwarding the coolant or the coolants from the end section into the probe head and vice versa.

14. The measuring device housing as claimed in claim 2, wherein the fastening comprises a screw connection.

* * * * *